US008645547B1

(12) United States Patent  (10) Patent No.: US 8,645,547 B1
Jain et al.  (45) Date of Patent: Feb. 4, 2014

(54) METHODS AND SYSTEMS FOR PROVIDING A MESSAGING SERVICE (75) Inventors: Akash Jain, Irving, TX (US); Amit Singh, Irving, TX (US); Mohammad Azzam, Irving, TX (US); Fariborz Ebrahimi, Arlington, VA (US); Pichappan Pethachi, Tampa, FL (US)

(73) Assignee: Verizon Data Services LLC, Temple Terrace, FL (US)

( * ) Notice: Subject to any disclaimer, the term of this patent is extended or adjusted under 35 U.S.C. 154(b) by 1027 days.

(21) Appl. No.: 11/252,543

(22) Filed: Oct. 19, 2005

Related U.S. Application Data (63) Continuation-in-part of application No. 10/898,110, filed on Jul. 23, 2004, now Pat. No. 7,870,270, and a continuation-in-part of application No. 10/898,111, filed on Jul. 23, 2004, now Pat. No. 8,407,188, and a continuation-in-part of application No. 10/897,744, filed on Jul. 23, 2004, now Pat. No. 7,680,797.

(60) Provisional application No. 60/489,988, filed on Jul. 25, 2003.

(51) Int. Cl.
G06F 15/16 (2006.01)
G06F 15/173 (2006.01)

(52) U.S. Cl.
USPC ........... 709/227; 709/204; 709/205; 709/206; 709/207; 709/225

(58) Field of Classification Search
USPC ................................. 709/204–207, 227, 225
See application file for complete search history.

(56) References Cited

U.S. PATENT DOCUMENTS

| 5,428,694 | A | 6/1995 | Betts et al. |
| 5,704,029 | A | 12/1997 | Wright |
| 5,809,497 | A | 9/1998 | Freund et al. |
| 5,911,143 | A | 6/1999 | Deinhart et al. |
| 6,161,139 | A | 12/2000 | Win et al. |
| 6,223,184 | B1 | 4/2001 | Blackman et al. |
| 6,289,333 | B1 * | 9/2001 | Jawahar et al. .................. 707/2 |
| 6,308,173 | B1 | 10/2001 | Glasser et al. |
| 6,314,415 | B1 | 11/2001 | Mukherjee |
| 6,380,954 | B1 | 4/2002 | Gunther |
| 6,430,571 | B1 | 8/2002 | Doan et al. |
| 6,460,141 | B1 * | 10/2002 | Olden .............................. 726/4 |
| 6,473,769 | B1 | 10/2002 | Andrew et al. |
| 6,535,883 | B1 | 3/2003 | Lee et al. |

(Continued)

OTHER PUBLICATIONS

David Stokes; Implementing Online Chat in a Web Portal; May 1, 2003; Retrieved from http://www.ibm.com/developerworks/ibm/library/i-portalchat/; 17 pages.*

(Continued)

*Primary Examiner* — Chau Le (57) ABSTRACT

Systems and methods for providing a messaging service may comprise receiving first user credentials and second user credentials corresponding to first user and second user respectively. In addition, systems and methods for providing a messaging service may include generating first capabilities and second capabilities, the first capabilities being based on roles corresponding to the first user and the second capabilities being based on roles corresponding to the second user. Moreover, systems and methods for providing a messaging service may include allowing a messaging session between the first user and the second user based on the first capabilities and the second capabilities.

40 Claims, 4 Drawing Sheets

(56) References Cited

U.S. PATENT DOCUMENTS

| | | |
|---|---|---|
| 6,662,231 B1 | 12/2003 | Drosset et al. |
| 6,816,906 B1 | 11/2004 | Icken et al. |
| 6,931,402 B1 | 8/2005 | Pereira |
| 6,976,078 B1 | 12/2005 | Icken et al. |
| 6,985,953 B1 | 1/2006 | Sandhu et al. |
| 7,010,760 B2 | 3/2006 | Arnstein et al. |
| 7,089,319 B2 | 8/2006 | Lysenko et al. |
| 7,117,504 B2 | 10/2006 | Smith et al. |
| 7,185,044 B2 | 2/2007 | Ryan et al. |
| 7,240,360 B1 | 7/2007 | Phan |
| 7,246,320 B2 | 7/2007 | Foucher et al. |
| 7,404,140 B2 | 7/2008 | O'Rourke |
| 7,899,867 B1* | 3/2011 | Sherstinsky et al. .......... 709/206 |
| 2001/0054064 A1* | 12/2001 | Kannan ........................ 709/203 |
| 2002/0032596 A1 | 3/2002 | Ohsaki et al. |
| 2002/0040352 A1 | 4/2002 | McCormick |
| 2002/0087383 A1 | 7/2002 | Cogger et al. |
| 2002/0147743 A1 | 10/2002 | Le et al. |
| 2002/0180789 A1 | 12/2002 | Guttmann et al. |
| 2003/0018725 A1* | 1/2003 | Turner et al. .................. 709/206 |
| 2003/0036940 A1 | 2/2003 | Leymann et al. |
| 2003/0084401 A1 | 5/2003 | Abel et al. |
| 2003/0110443 A1 | 6/2003 | Yankovich et al. |
| 2003/0233296 A1 | 12/2003 | Wagner |
| 2004/0010502 A1 | 1/2004 | Bomfim et al. |
| 2004/0064783 A1 | 4/2004 | Braun et al. |
| 2004/0078105 A1 | 4/2004 | Moon et al. |
| 2004/0078446 A1* | 4/2004 | Daniell et al. ................ 709/206 |
| 2004/0083426 A1 | 4/2004 | Sahu |
| 2004/0181513 A1 | 9/2004 | Henderson et al. |
| 2004/0205529 A1 | 10/2004 | Poulose et al. |
| 2004/0236655 A1 | 11/2004 | Scumniotales et al. |
| 2004/0255252 A1 | 12/2004 | Rodriguez et al. |
| 2005/0005259 A1 | 1/2005 | Avery et al. |
| 2005/0010547 A1 | 1/2005 | Carinci et al. |
| 2005/0060167 A1* | 3/2005 | Patron et al. ...................... 705/1 |
| 2005/0187781 A1* | 8/2005 | Christensen ...................... 705/1 |
| 2005/0235034 A1* | 10/2005 | Chen et al. .................... 709/206 |
| 2005/0257045 A1* | 11/2005 | Bushman et al. .............. 713/156 |
| 2006/0080130 A1* | 4/2006 | Choksi .............................. 705/1 |
| 2006/0101098 A1* | 5/2006 | Morgan et al. ................. 707/204 |
| 2006/0101119 A1 | 5/2006 | Qureshi et al. |
| 2007/0016641 A1* | 1/2007 | Broomhall ..................... 709/206 |
| 2007/0214001 A1* | 9/2007 | Patron et al. ...................... 705/1 |
| 2008/0086564 A1* | 4/2008 | Putman et al. ................. 709/227 |
| 2008/0126988 A1 | 5/2008 | Mudaliar |
| 2008/0127032 A1 | 5/2008 | Mital et al. |

OTHER PUBLICATIONS

IPSwitch Instant Messaging; Instant Messaging as a Business Tool; Retrieved from the www.waybackmachine.org of site www.ipswitch.net, Available online Dec. 7, 2004, pp. 1-6.*

Index of /candan/papers, http://aria.asu.edu/candan/papers, four pages, retrieved from the internet on Oct. 2, 2007.

Candan, et al., "Integration of Database and Internet Technologies for Scalable End-to-end E-commerce Systems," Architectural Issues of Web-Enabled Electronic Business, Chapter 6, Idea Group Publishing, pp. 84-112, Copyright 2003.

* cited by examiner

METHODS AND SYSTEMS FOR PROVIDING A MESSAGING SERVICE

CROSS REFERENCE TO RELATED APPLICATIONS

This application is a continuation-in-part of U.S. patent application Ser. No. 10/898,110, filed Jul. 23, 2004, and entitled METHODS AND SYSTEMS FOR PROVIDING CAPABILITY MANAGEMENT AND USER ADMINISTRATION; U.S. patent application Ser. No. 10/898,111, filed Jul. 23, 2004, and entitled METHODS AND SYSTEMS FOR PROVIDING DATA FORM MANAGEMENT; and U.S. patent application Ser. No. 10/897,744, filed Jul. 23, 2004 and entitled METHODS AND SYSTEM FOR PROVIDING A DATA ACCESS LAYER, each of which are assigned to the assignee of the present application, and each of which claim the benefit of priority to U.S. Provisional Patent Application No. 60/489,988, filed Jul. 25, 2003. The disclosures of each of these applications are expressly incorporated herein by reference to their entireties.

This application is related to U.S. patent application Ser. No. 11/252,606, filed on even date herewith in the name of Edy Setiawan et al. and entitled METHODS AND SYSTEMS FOR PROVIDING PROCESS FLOW MANAGEMENT; U.S. patent application Ser. No. 11/252,544, filed on even date herewith in the name of Akash Jain et al. and entitled METHODS AND SYSTEMS FOR INTEGRATING A MESSAGING SERVICE WITH AN APPLICATION; and U.S. patent application Ser. No. 11/252,566, filed on even date herewith in the name of Edy Setiawan et al. and entitled METHODS AND SYSTEMS FOR DEFINING A FORM NAVIGATIONAL STRUCTURE, each assigned to the assignee of the present application, the disclosures of which are expressly incorporated herein by reference.

TECHNICAL FIELD

The present invention generally relates to providing a messaging service. More particularly, the present invention relates to providing a messaging service based on capabilities associated with the messaging service's users.

BACKGROUND INFORMATION

Providing help desk functionality is one of the most critical parts of a call center. Call center representatives may provide help to both customers as well as other representatives. In particular, many call centers have a specialized help desk group for calls routed from online representatives when escalation, questions, or feedback arise.

The primary communication channel in call centers today is the telephone. A call routing system takes incoming calls from where they are assigned to an available call center representative (or a help desk representative). Representatives can change the status of their availability by pressing a button on their desk, connected to the phone, to let the call routing system know if they are online, unavailable, or offline. Other communication channels used in call centers are email and fax which, though cheaper, do not provide real-time communication and are thus less frequently used.

Though the telephone provides a reliable and real-time communication channel, it has many drawbacks. For example, using a telephone, a representative can only handle one customer at a time. Even if the representative handles multiple customers using multiple lines, the representative has to put the other customers on hold, which makes the customers dissatisfied. Moreover, after handling a call, representatives must usually document the assistance that they provided and the action they took. This manual information entry increases hold time and potential errors.

Furthermore, it is difficult to control features and access for a representative that uses a telephone. Changes cannot be done on the fly, as they usually need to be done on a phone switch needing a technician to physically go to the switch and do the changes. Hence, changes incur a heavy cost and latency. Although calls may be recorded for quality assurance and future reference, it is difficult to extract information out of these recorded calls. Voice recognition and extraction technology is still in its nascent stages. As a result, a meaningful knowledge base that can be used later cannot be created with the current telephone systems. Also, using the telephone distracts call center representatives because they primarily use a PC while working. In addition, telephones do not provide an easy way to broadcast messages to multiple people quickly.

Thus, there is a need for improved systems and methods for providing a messaging service. For instance, there is a need for a fully configurable, plug and play type of messaging system that has a message routing engine at its core. The system may be fully secure, as valuable customer information will often be exchanged over the network. The system may provide an alternative channel for providing real-time messaging and collaboration for call center operations, thus reducing cost and increasing effectiveness.

SUMMARY OF THE INVENTION

Consistent with embodiments of the present invention, systems and methods are disclosed for providing a messaging service.

In one aspect, a method for providing a messaging service comprises receiving first user credentials and second user credentials corresponding to a first user and a second user respectively, generating first capabilities and second capabilities, the first capabilities being based on roles corresponding to the first user and the second capabilities being based on roles corresponding to the second user, and allowing a messaging session between the first user and the second user based on the first capabilities and the second capabilities.

In another aspect, a system for providing a messaging service comprises a memory storage for maintaining a database and a processing unit coupled to the memory storage, wherein the processing unit is operative to receive first user credentials and second user credentials corresponding to a first user and a second user respectively, generate first capabilities and second capabilities, the first capabilities being based on roles corresponding to the first user and the second capabilities being based on roles corresponding to the second user, and allow a messaging session between the first user and the second user based on the first capabilities and the second capabilities.

In yet another aspect, a computer-readable medium comprising a set of instructions which when executed perform a method for providing a messaging service, the method comprising receiving first user credentials and second user credentials corresponding to a first user and a second user respectively, generating first capabilities and second capabilities, the first capabilities being based on roles corresponding to the first user and the second capabilities being based on roles corresponding to the second user, and allowing a messaging session between the first user and the second user based on the first capabilities and the second capabilities.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

The following detailed description refers to the accompanying drawing. Wherever possible, the same reference numbers are used in the drawing and the following description to refer to the same or similar parts. While a presently preferred embodiment and features of the invention are described herein, modifications, adaptations and other implementations are possible, without departing from the spirit and scope of the invention. For example, substitutions, additions or modifications may be made to the components illustrated in the drawing, and the exemplary methods described herein may be modified by substituting, reordering or adding steps to the disclosed methods. Accordingly, the following detailed description does not limit the invention. Instead, the proper scope of the invention is defined by the appended claims.

Providing help desk functionality is an important part of a call center. The messaging systems and methods consistent with the invention may provide fully configurable help desk service for enterprise and small business customers, for example. The systems and methods may enable a enterprise's customers, or other seeking service, to engage in chat conversations with call center representatives. In addition, the systems and methods may automatically route instant messages to call center representatives based on their availability and the time the message entered the queue, for example.

Consistent with an embodiment of the present invention, the systems and methods may be integrated to any enterprise application that representatives already use. Hence, the representatives can get started on the application quickly, as they are already familiar with the "user experience" and the look and feel of the enterprise application that the representatives already uses. A powerful set of reporting features may be included to monitor and manage the call center operations and prevent any misuse of real-time messaging capabilities.

The messaging systems and methods consistent with the invention may be web-based and configured to run on a web browser. On the client side, for example, the system may use applet technology. An applet can be inserted into any HTML page. Therefore, users do not need to install anything on their machines and can access the messaging system through a standard browser. Communication between the client and the server may be secured using the HTTPS protocol. Furthermore, the messaging system may use a J2EE 1.3 compliant application server for the servlet engine and to carry out database updates in a transaction. The communication between a client and the system for chatting may be accomplished by opening sockets. These sockets may be opened using HTTP/1.1 protocol so that multiple requests and responses may be sent within the same connection. Also, by wrapping the payload over HTTP, the packets may be tunnel through firewalls.

Consistent with embodiments of the invention, a user may login by providing user credentials, comprising, for example, a user ID, a password, or a current role. Once the credentials are validated, the system may obtain the user profile for the current role from the database and caches it in memory for fast reference in future. The profile may contain all of the capabilities that the user in the current role has been given with respect to other roles or users. The profile information may only be sent to a client when the client demands it. This may allow the user to login and open, for example, a buddy list more quickly. The user may be allowed to initiate only those messaging sessions that are assigned to them according to their designated capabilities. Also, whenever the administrator changes the capabilities of a user, the user's profile may be updated and the user may see the new assigned capabilities.

An embodiment consistent with the invention may comprise a messaging service system. The system may comprise a memory storage for maintaining a database and a processing unit coupled to the memory storage. The processing unit may be operative to receive first user credentials and second user credentials corresponding to a first user and a second user respectively. Furthermore, the processing unit may be operative to generate first capabilities and second capabilities, the first capabilities being based on roles corresponding to the first user and the second capabilities being based on roles corresponding to the second user. Moreover, the processing unit may be operative to allow a messaging session between the first user and the second user based on the first capabilities and the second capabilities.

Figure 1:
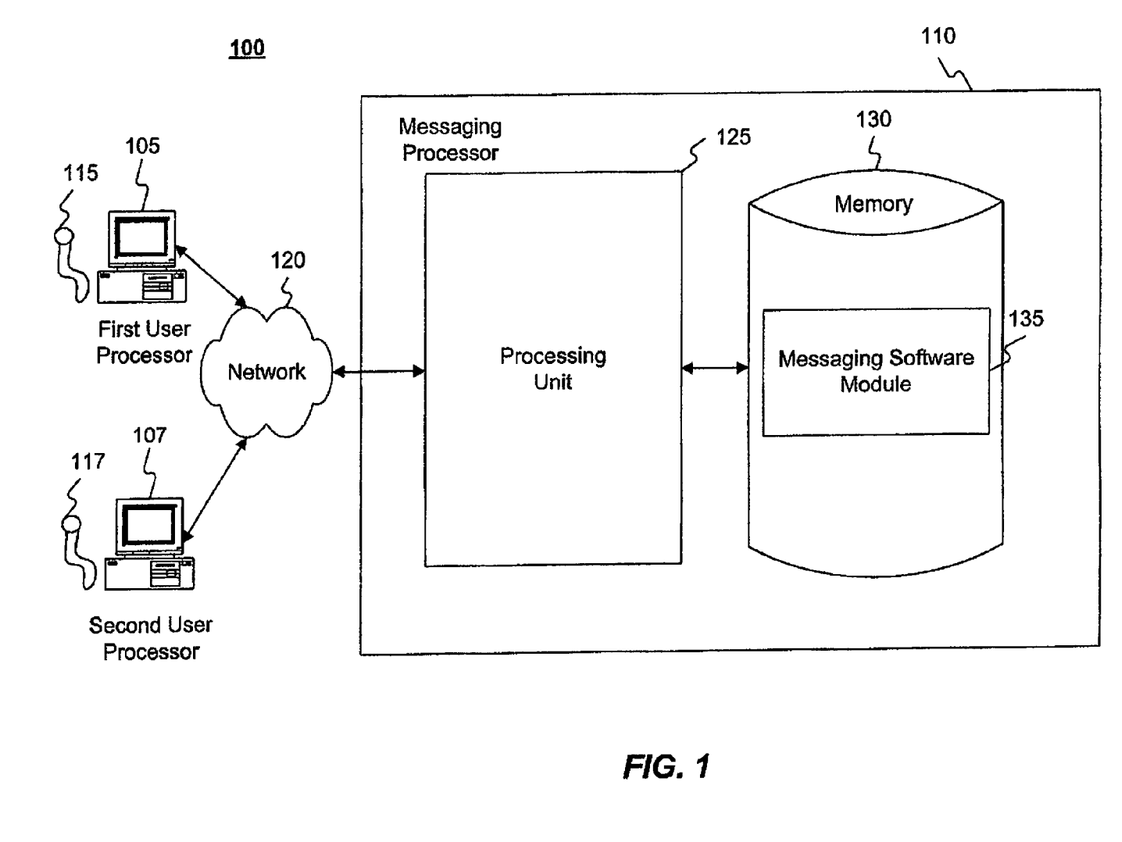
FIG. 1 is a functional block diagram of an exemplary system for providing a messaging service consistent with an embodiment of the present invention.

Consistent with an embodiment of the present invention, the aforementioned memory, processing unit, and other components may be implemented in a messaging service system, such as the exemplary messaging service system 100 of FIG. 1. Any suitable combination of hardware, software and/or firmware may be used to implement the memory, processing unit, or other components. By way of example, the memory, processing unit, or other components may be implemented with a messaging processor 110 in combination with system 100. The aforementioned system and device are exemplary and other systems and devices may comprise the aforementioned memory, processing unit, or other components, consistent with embodiments of the present invention.

By way of a non-limiting example, FIG. 1 illustrates system 100 in which the features and principles of the present invention may be implemented. As illustrated in the block diagram of FIG. 1, system 100 may include a first user processor 105 operated by a first user 105, a second user processor 107 operated by a second user 117, a network 120, and messaging processor 110. Messaging processor 110 may include a processing unit 125 and a memory 130. Memory 130 may include a messaging software module 135 that, when executed on processing unit 125, causes messaging processor 110 to carry out various embodiments consistent with the invention.

First user processor 105, second user processor 107, and messaging processor 110 ("the processors") included in system 100 may be implemented using a personal computer, network computer, mainframe, or other similar microcomputer-based workstation. The processors may comprise any type of computer operating environment, such as hand-held devices, multiprocessor systems, microprocessor-based or programmable sender electronic devices, minicomputers, mainframe computers, and the like. The processors may also be practiced in distributed computing environments where tasks are performed by remote processing devices. Furthermore, any of the processors may comprise a mobile terminal, such as a smart phone, a cellular telephone, a cellular telephone utilizing wireless application protocol (WAP), personal digital assistant (PDA), intelligent pager, portable computer, a hand held computer, a conventional telephone, or a facsimile machine. The aforementioned systems and devices are exemplary and the processor may comprise other systems or devices.

Network 120 may include any data network, such as, for example, an existing secure credit network, a local area network (LAN), a wide area network (WAN), a public telephone switching network, an automated clearing house (ACH) network, or a wide area network, such as the Internet. LAN or WAN networking environments are commonplace in offices, enterprise-wide computer networks, intranets, and the Internet, and are known by those skilled in the art. When a LAN is used as network 120, a network interface located at any of the processors may be used to interconnect any of the processors. When network 120 is implemented in a WAN networking environment, such as the Internet, the processors may typically include an internal or external modem (not shown) or other means for establishing communications over the WAN. Further, in utilizing network 120, data sent over network 120 may be encrypted to ensure data security by using known encryption/decryption techniques.

In addition to utilizing a wire line communications system as network 120, a wireless communications system, or a combination of wire line and wireless may be utilized as network 120 in order to, for example, exchange web pages via the Internet, exchange e-mails via the Internet, or for utilizing other communications channels. Wireless can be defined as radio transmission via the airwaves. However, it may be appreciated that various other communication techniques can be used to provide wireless transmission, including infrared line of sight, cellular, microwave, satellite, packet radio and spread spectrum radio. The processors in the wireless environment can be any mobile terminal, such as the mobile terminals described above. Wireless data may include, but is not limited to, paging, text messaging, e-mail, Internet access and other specialized data applications specifically excluding or including voice transmission.

System 100 may also transmit data by methods and processes other than, or in combination with, network 120. These methods and processes may include, but are not limited to, transferring data via, diskette, CD ROM, facsimile, conventional mail, an interactive voice response system (IVR), or via voice over a publicly switched telephone network.

Figure 2:
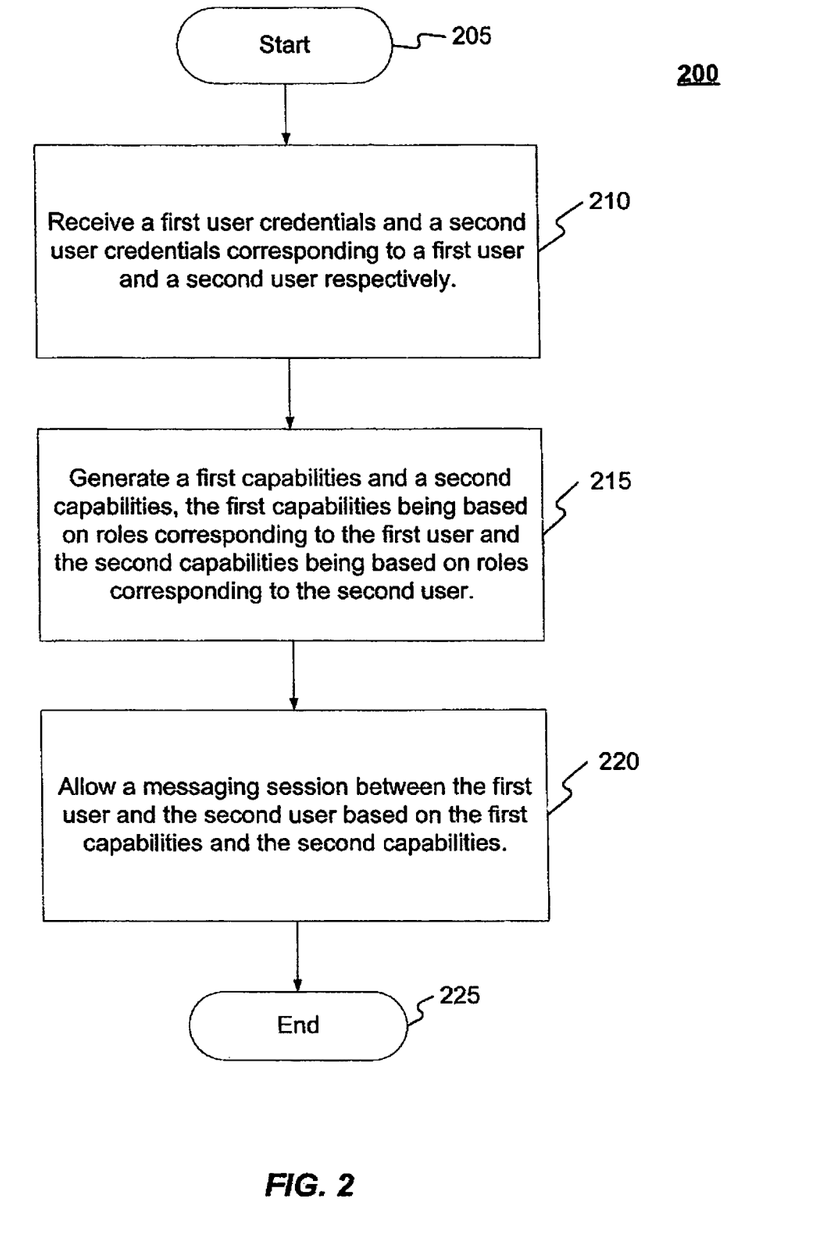
FIG. 2 is a flow chart of an exemplary method for providing a messaging service consistent with an embodiment of the present invention.

FIG. 2 is a flow chart setting forth the general stages involved in an exemplary method for providing a messaging service. Exemplary ways to implement the stages of method 200 will be described in greater detail below. Exemplary method 200 may begin at starting block 205 and proceed to stage 210 where messaging processor 110 may receive a first user credentials and a second user credentials corresponding to first user 115 and second user 117 respectively. For example, user 115 and user 117 may login by providing user credentials to messaging processor 110 through first user processor 105 and second user processor respectively. The user credentials may comprise, for example, a user ID, a password, a current role, a name, a phone number, a supervisor's name, an email address, or a fax number. The aforementioned credentials are exemplary and other may be used.

From stage 210, where messaging processor 110 receives the first user credentials and the second user credentials corresponding to first user 115 and second user 117 respectively, exemplary method 200 may advance to stage 215 where messaging processor 110 may generate a first capabilities and a second capabilities. The first capabilities may be based on roles corresponding to first user 115 and the second capabilities may be based on roles corresponding to second user 117. For example, messaging processor 110 may validate the credentials for user 115 and user 117 and then may fetch a user profile for the current role from a database in memory 130 for bother users. Messaging processor 110 may caches a user profiles in memory contained in processing unit 125, for example, for fast reference in future. The profiles may contain all of the capabilities that the users in their respective current role have been given with respect to other roles or users.

As stated above, each system user may have a unique identity determined by their user ID. These user credentials are loaded into a database prior to the user logging into the system. Each user may be assigned one or more roles, by an administrator, based on the business functions that they need to perform. A role may comprise an abstraction of the set of functionalities that is given to a user. A user may have at least one role. For example, a role may comprise a combination of region, district, center, and department corresponding to a user within an enterprise. An example role may comprise the Northeast-Delaware-Help-Desk (a role providing help desk capability in Northeast region for Delaware center.) New roles can be defined based on different business structures. Because a role may comprise an abstraction, it can be implemented differently for different business needs.

Users in system 100 may be involved in different kinds of messaging sessions. These session may comprise, but are not limited to, one-to-one (point-to-point), broadcast, coaching, or ask-a-question. Different sessions may serve different objectives. For example, an ask-a-question session may be used by online representatives to ask a question to Help-Desk representatives. The question may go into a message queue and maybe assigned to the first available Help-Desk representative. After the Help-Desk representative has replied to the question, a ticket may be created for future reference and documentation. Similarly, a coaching session may be used by call center administrators to provide coaching for a representative. A one-to-one session may allow two users to send instant messages to each other.

Users (or roles) may be given capabilities that control their interactions with other users (or roles). These capabilities may include, but are not limited to, the type of a messaging session that a user (or role) can initiate with other users (or roles), or can be access to a feature such as emailing or faxing the chat transcript or file transfer during a messaging session. An administrator may configure the capabilities at both the user and the role levels. For example, an administrator may disable the file transfer feature from role X to role Y. This would mean that any user in role X may not be able to send a file to any user in role Y when a user in role X is in a messaging session with a user in role Y. The administrator may also disable the file transfer feature for one specific user from role X to all users belonging to role Y. The other role X users may still be enabled.

Once messaging processor 110 generates the first capabilities and the second capabilities at stage 215, exemplary method 200 may continue to stage 220 where messaging processor 110 may allow a messaging session between first user 115 and second user 117 based on the first capabilities and the second capabilities. For example, user 105 and user 107 may be allowed to initiate only those messaging sessions that are assigned to them according to their designated capabilities. Also, whenever an administrator changes the capabilities of a given user, the user's profile may be updated and the user may see the new assigned capabilities.

For example, system 100 may maintain multiple Help-Desk queues for ask-a-question sessions. These sessions may only be initiated on a role (and not on a particular user). The session goes into the Help Desk queue for the role on which this session was initiated. Whenever a representative belonging to the role on which the session was initiated is available, the session may be pushed to that representative so that it can be answered. The assignment of sessions may be done on a priority-based business specific algorithm or on a first-come-first-serve basis. If a session is pushed to one Help-Desk representative and they do not reply to that session within a certain amount of time, the session may be automatically re-queued so that another available representative can take the session.

Furthermore, users in a Help-Desk role may be assigned to the ask-a-question sessions initiated on that role. Also, if a new Help Desk role is created in the database and some users are assigned that role, the system may dynamically creates a new Help Desk queue and manage the assignment of ask-a-question sessions to the users of this role.

Figure 3:
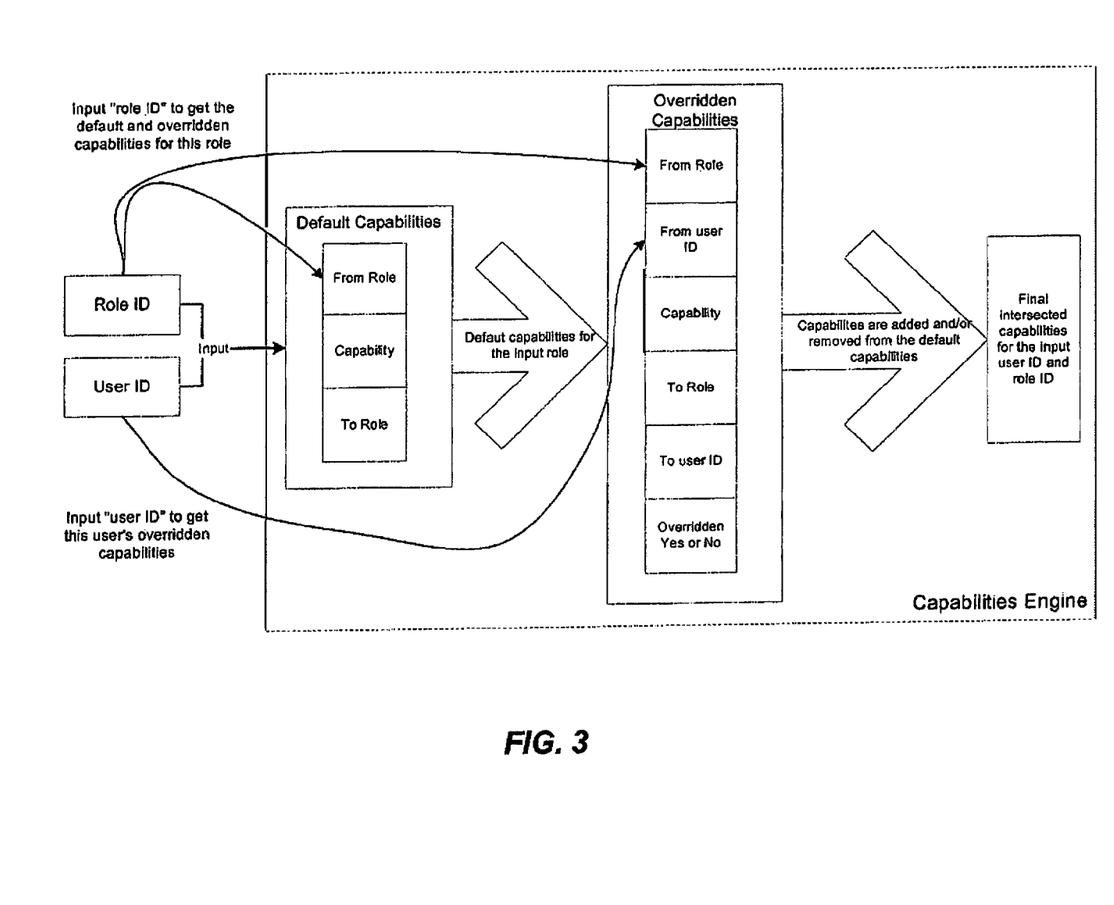
FIG. 3 is an exemplary diagram that illustrates generating the capabilities of a user consistent with an embodiment of the present invention.

FIG. 3 illustrates generating capabilities of a user belonging to a particular role. User ID and role ID are given as input to a capabilities engine that outputs the capabilities of the given user in this role on other roles and users. The capabilities engine may first extract the default capabilities of the input role from the database. It may then extract the overridden capabilities for the given user and role and may add or delete the overridden capabilities to or from the default capabilities. The capabilities engine may comprise a programming module executed on messaging processor 110. For example, the capabilities engine may be included in messaging software module 135.

An administrator may configure the capabilities at the user or the role level. Initially, default capabilities may be given to roles and the user may be assigned the capabilities of the role that the user is currently in. If the administrator changes the capabilities of a role, the database may be updated to change the default capabilities and all the users inside that role are affected. Also, an administrator may also change the capability of one particular user in a role. This may be achieved by creating an overridden capability and storing it in the database. When the server creates the profile for this user, this overridden capability may be intersected with the default capabilities to generate the final set of capabilities. After messaging processor 110 allows a messaging session between first user 115 and second user 117 at stage 220, exemplary method 200 ends at stage 225.

In addition, embodiments of the invention may include a knowledge base used to create an archive of the "knowledge" that transpires between various operational groups and users in a call center. Sessions may be stored in a database and may be used to create a knowledge base. This knowledge base may provide answers to a representative's questions without the representative needing to start a messaging session. The knowledge base may be divided by categories for easier browsing and users may be free to create new categories on the fly if, for example, this is a business demand it. A search feature may be provided for the representatives to intelligently perform a search within the knowledge base.

Furthermore, embodiments of the invention may include a reporting and auditing function. A set of reports may be provided in the system. This may enable call center administrators or managers to monitor the usage of the system and stop any misuse. Some reports also may calculate call center metrics like Average Work Time (AWT), Average Messaging Time (AMT), Average Handling Time (AHT), for example, to quantify the advantages of using the system over another communication channel.

Moreover, embodiments of the invention may include a security feature. For example, messages that transpire through the system may be encrypted using 128-bit encryption. Also, the system may use the SSL protocol for encryption between the client and the server.

Figure 4:
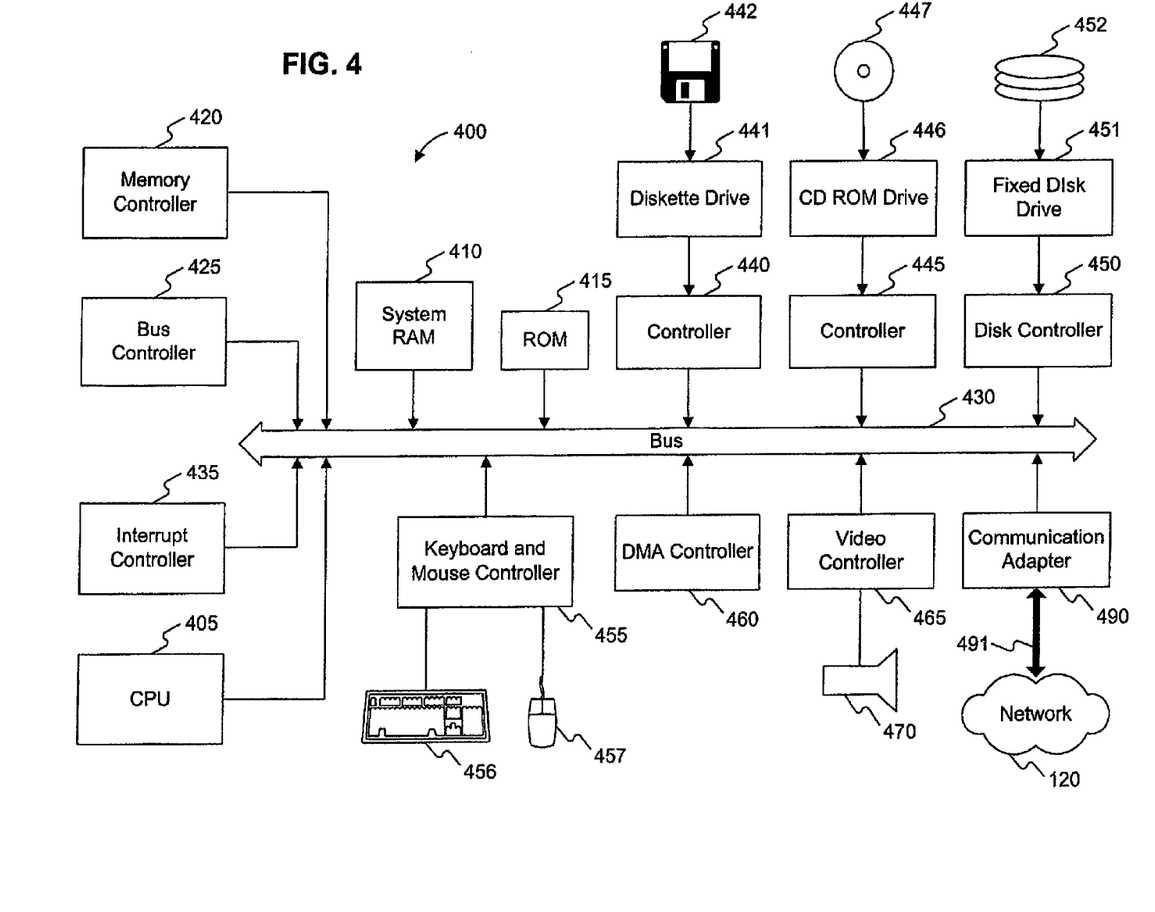
FIG. 4 is a functional block diagram of an exemplary computer system consistent with an embodiment of the present invention.

As herein embodied and illustrated in FIG. 4 is a diagram of a system architecture for a computer system 400 with which the invention may be implemented. Consistent with an exemplary embodiment of the present invention, processors, as described above including, first user processor 105, second user processor 107, and messaging processor 110, may comprise, be disposed, or implemented within computer system 400. Although the description may refer to terms commonly used in describing particular computer systems, such as a personal computer, the description and concepts equally apply to other computer systems, such as network computers, workstations, and even mainframe computers having architectures dissimilar to FIG. 4.

Computer system 400 includes a central processing unit (CPU) 405, which may be implemented with a conventional microprocessor, a random access memory (RAM) 410 for temporary storage of information, and a read only memory (ROM) 415 for permanent storage of information. A memory controller 420 controls the RAM 410.

A bus 430 interconnects the components of computer system 400. A bus controller 425 controls the bus 430. An interrupt controller 435 receives and processes various interrupt signals from the system components.

Mass storage may be provided by diskette 442, CD ROM 447, or hard drive 452. Data and software may be exchanged with computer system 400 via removable media such as diskette 442 and CD ROM 447. Diskette 442 inserts into diskette drive 441 which, in turn, connects to bus 430 via a controller 440. Similarly, CD ROM 447 inserts into CD ROM drive 446 which, in turn, connects to bus 430 via controller 445. Hard disk 452 is part of a fixed disk drive 451 that connects to bus 430 by controller 450.

User input to computer system 400 may be provided by a number of devices. For example, a keyboard 456 and mouse 457 connect to bus 430 via controller 454. In addition, other input devices, such as a pen, a tablet, or speech recognition mechanisms, may connect to bus 430 and an appropriate controller and software. A direct memory access (DMA) controller 460 performs direct memory access to RAM 410. User output may be generated by a video controller 465 that controls video display 470.

Computer system 400 also includes a communications adaptor 490 that allows the system to be interconnected to additional computing resources via a local area network (LAN) or a wide area network (WAN), such as the Internet, schematically illustrated by bus 491 and network 120. Signals traveling through network 120 can generally be referred to as "carrier waves" that transport information. Although aspects of the present invention are described as being stored in memory in the form of instructions, those aspects may be stored on other computer-readable media, such as secondary storage devices like hard disks, floppy disks, or CD ROM, or other forms of RAM or ROM, or a carrier wave.

Operation of computer system 400 is generally controlled and coordinated by operating system software. The operating system controls allocation of system resources and performs tasks, such as memory management, process scheduling, networking, and services, among other things.

While certain features and embodiments of the invention have been described, other embodiments of the invention will be apparent to those skilled in the art from consideration of the specification and practice of the embodiments of the invention disclosed herein. Furthermore, although embodiments of the present invention have been described as being associated with data stored in memory and other storage mediums, one skilled in the art will appreciate that these aspects can also be stored on or read from other types of computer-readable media, such as secondary storage devices, hard disks, floppy disks, a CD-ROM, a carrier wave from the Internet, or other forms of RAM or ROM. Further, the steps of the disclosed methods may be modified in any manner, including by reordering steps and/or inserting or deleting steps, without departing from the principles of the invention.

It is intended, therefore, that the specification be considered as exemplary only, with a true scope and spirit of the invention being indicated by the following claims and their full scope of equivalents.

What is claimed is:

1. A method for providing a messaging service, the method comprising:
receiving, using a processor, first user credentials and second user credentials corresponding to a first user and a second user, respectively;
generating, using the processor, first capabilities and second capabilities, the first capabilities being based on roles corresponding to the first user, and the second capabilities being based on roles corresponding to the second user, the generating comprising:
retrieving, from a database, default capabilities associated with the roles of the first user or default capabilities associated with the roles of the second user;
obtaining an overridden capability from the database, the overridden capability being linked to at least one of the first user or the second user; and
modifying the default capabilities of the first user or the default capabilities of the second user in accordance with the overridden capability;
establishing, using the processor, a messaging session between the first user and the second user based on the first capabilities and the second capabilities;
detecting, during the messaging session, a performance metric associated with at least one of the first user or the second user;
obtaining a report comprising information describing at least one performance metric detected during a prior messaging session associated with at least one of the first user or the second user;
identifying, based on the detected performance metric and the obtained report, a misuse of the messaging session by at least one of the first user or the second user; and
terminating the messaging session in response to the detected misuse.

2. The method of claim 1, wherein the first user credentials and the second user credentials comprise, for each user, at least one of a user ID, a password, a current role, a name, a phone number, a supervisor's name, an email address, and a fax number.

3. The method of claim 1, wherein the messaging session comprises one of an ask-a-question session, a coaching session, a broadcast session, or a one-to-one session.

4. The method of claim 1, wherein one of the first user and the second user comprises a customer service representative.

5. The method of claim 1, wherein at least one of the roles corresponding to the first user and the roles corresponding to the second user comprise one of a user's region, district, center, or department.

6. The method of claim 1, wherein at least one of the roles corresponding to the first user and the roles corresponding to the second user comprise an abstraction of a set of functionalities given to the respective first user and second user.

7. The method of claim 1, wherein at least one of the first capabilities and the second capabilities comprise at least one of a type of a messaging session that a given user can initiate with other users, access to emailing, access to faxing a chat transcript, or access to file transfer during a messaging session.

8. The method of claim 1, wherein allowing the messaging session further comprises allowing the messaging session on one of a first come first serve and a priority basis.

9. The method of claim 1, further comprising storing, using the processor, the messaging session between the first user and the second user in a database to form the archive.

10. The method of claim 1, further comprising creating, using the processor, the report based on at least one of an average work time (AWT), an average messaging time (AMT), or an average handling time (AHT).

11. The method of claim 1, wherein the modifying comprises:
adding the overridden capability to the default capabilities of the first user or the default capabilities of the second user, or deleting the overridden capability from the default capabilities of the first user or the default capabilities of the second user.

12. The method of claim 1, wherein the report comprises a first report, and the method further comprises:
generating, upon completion of the messaging session, a second report comprising the detected performance metric.

13. The method of claim 1, wherein the overridden capability is associated with a corresponding role.

14. The method of claim 13, wherein generating the first capabilities comprises:
determining whether the first user roles include the overridden capability role; and
modifying the default capabilities of the first user in accordance with the overridden capability, when the first user roles include the overridden capability role.

15. The method of claim 13, wherein generating the second capabilities comprises:
determining whether the second user roles include the overridden capability role; and
modifying the default capabilities of the second user in accordance with the overridden capability, when the second user roles include the overridden capability role.

16. The method of claim 1, further comprising providing, using the processor, an archive comprising one or more stored messaging sessions, the archive being divided into a plurality of categories, the categories of the archive being searchable by the first user or the second user to identify an answer to a question prior to or during the messaging session.

17. A system for providing a messaging service, the system comprising:
a memory storage for maintaining a database; and
a processing unit coupled to the memory storage, wherein the processing unit is operative to:
receive first user credentials and second user credentials corresponding to a first user and a second user, respectively;

generate first capabilities and second capabilities, the first capabilities being based on roles corresponding to the first user, and the second capabilities being based on roles corresponding to the second user, the processor being further operative to:
retrieve, from a database, default capabilities associated with the roles of the first user or default capabilities associated with the roles of the second user;
obtain an overridden capability from the database, the overridden capability being linked to at least one of the first user or the second user; and
modify the default capabilities of the first user or the default capabilities of the second user in accordance with the overridden capability;
establish a messaging session between the first user and the second user based on the first capabilities and the second capabilities;
detecting, during the messaging session, a performance metric associated with at least one of the first user or the second user;
obtaining a report comprising information describing at least one performance metric detected during a prior messaging session associated with at least one of the first user or the second user;
identifying, based on the detected performance metric and the obtained report, a misuse of the messaging session by at least one of the first user or the second user; and
terminating the messaging session in response to the detected misuse.

18. The system of claim 17, wherein the first user credentials and the second user credentials comprise, for each user, at least one of a user ID, a password, a current role, a name, a phone number, a supervisor's name, an email address, and a fax number.

19. The system of claim 17, wherein the messaging session comprises one of an ask-a-question session, a coaching session, a broadcast session, or a one-to-one session.

20. The system of claim 17, wherein one of the first user and the second user comprises a customer service representative.

21. The system of claim 17, wherein at least one of the roles corresponding to the first user and the roles corresponding to the second user comprise one of a user's region, district, center, or department.

22. The system of claim 17, wherein at least one of the roles corresponding to the first user and the roles corresponding to the second user comprise an abstraction of a set of functionalities given to the respective first user and second user.

23. The system of claim 17, wherein at least one of the first capabilities and the second capabilities comprise at least one of a type of a messaging session that a given user can initiate with other users, access to emailing, access to faxing a chat transcript, or access to file transfer during a messaging session.

24. The system of claim 17, wherein the processing unit operative to allow the messaging session is further operative to allow the messaging session on one of a first come first serve and a priority basis.

25. The system of claim 17, wherein the processing unit is further operative to store the messaging session between the first user and the second user in the database to form the archive.

26. The system of claim 17, wherein the processing unit is further operative to create the report based on at least one of an average work time (AWT), an average messaging time (AMT), or an average handling time (AHT).

27. The system of claim 17, wherein the processing unit operative to modify is further operative to:
add the overridden capability to the default capabilities of the first user or the default capabilities of the second user, or delete the overridden capability from the default capabilities of the first user or the default capabilities of the second user.

28. The system of claim 17, wherein the report comprises a first report, and wherein the processor unit is further configured to:
generate, upon completion of the messaging session, a second report comprising the detected performance metric.

29. A non-transitory computer-readable storage medium storing a set of instructions that, when executed by a processor, perform a method for providing a messaging service, the method comprising the steps performed by the processor of:
receiving, using a processor, first user credentials and second user credentials corresponding to a first user and a second user, respectively;
generating, using the processor, first capabilities and second capabilities, the first capabilities being based on roles corresponding to the first user, and the second capabilities being based on roles corresponding to the second user, the generating comprising:
retrieving, from a database, default capabilities associated with the roles of the first user or default capabilities associated with the roles of the second user;
obtaining an overridden capability from the database, the overridden capability being linked to at least one of the first user or the second user; and
modifying the default capabilities of the first user or the default capabilities of the second user in accordance with the overridden capability;
establishing, using the processor, a messaging session between the first user and the second user based on the first capabilities and the second capabilities;
detecting, during the messaging session, a performance metric associated with at least one of the first user or the second user;
obtaining a report comprising information describing at least one performance metric detected during a prior messaging session associated with at least one of the first user or the second user;
identifying, based on the detected performance metric and the obtained report, a misuse of the messaging session by at least one of the first user or the second user; and
terminating the messaging session in response to the detected misuse.

30. The computer-readable storage medium of claim 29, wherein the first user credentials and the second user credentials comprise, for each user, at least one of a user ID, a password, a current role, a name, a phone number, a supervisor's name, an email address, and a fax number.

31. The computer-readable storage medium of claim 29, wherein the messaging session comprises one of an ask-a-question session, a coaching session, a broadcast session, or a one-to-one session.

32. The computer-readable storage medium of claim 29, wherein one of the first user and the second user comprises a customer service representative.

33. The computer-readable storage medium of claim 29, wherein at least one of the roles corresponding to the first user and the roles corresponding to the second user comprise one of a user's region, district, center, or department.

34. The computer-readable storage medium of claim 29, wherein at least one of the roles corresponding to the first user and the roles corresponding to the second user comprise an abstraction of a set of functionalities given to the respective first user and second user.

35. The computer-readable storage medium of claim 29, wherein at least one of the first capabilities and the second capabilities comprise at least one of a type of a messaging session that a given user can initiate with other users, access to emailing, access to faxing a chat transcript, or access to file transfer during a messaging session.

36. The computer-readable storage medium of claim 29, wherein allowing the messaging session further comprises allowing the messaging session on one of a first come first serve and a priority basis.

37. The computer-readable storage medium of claim 29, further comprising storing the messaging session between the first user and the second user in a database to form the archive.

38. The computer-readable storage medium of claim 29, further comprising creating the report based on at least one of an average work time (AWT), an average messaging time (AMT), or an average handling time (AHT).

39. The computer-readable storage medium of claim 29, wherein the modifying comprises:
adding the overridden capability to the default capabilities of the first user or the default capabilities of the second user, or deleting the overridden capability from the default capabilities of the first user or the default capabilities of the second user.

40. The computer-readable storage medium of claim 29, wherein the report comprises a first report, and the method further comprises:
generating, upon completion of the messaging session, a second report comprising the detected performance metric.

* * * * *